United States Patent [19]
Hauner et al.

[11] Patent Number: 5,520,323
[45] Date of Patent: May 28, 1996

[54] METHOD FOR PRESOLDERING A CONTACT FOR AN ELECTRICAL SWITCHING DEVICE AND SEMI-FINISHED PRODUCT FOR USE AS A CONTACT

[75] Inventors: Franz Hauner, Röttenbach; Manfred Schneider, Lichtenfels, both of Germany

[73] Assignee: Siemens Aktiengesellschaft, München, Germany

[21] Appl. No.: 244,996

[22] PCT Filed: Dec. 21, 1992

[86] PCT No.: PCT/DE92/01073

§ 371 Date: Jun. 20, 1994

§ 102(e) Date: Jun. 20, 1994

[87] PCT Pub. No.: WO93/13535

PCT Pub. Date: Jul. 8, 1993

[30] Foreign Application Priority Data

Dec. 20, 1991 [DE] Germany ............... 41 42 374.7

[51] Int. Cl.$^6$ ............... B23K 37/06; H01H 1/02
[52] U.S. Cl. ............... 228/254; 228/215; 200/268; 200/275; 29/879; 428/577; 428/632; 427/123
[58] Field of Search ............... 228/122.1, 124.1, 228/179.1, 214, 215, 254; 148/431; 200/265, 268, 269, 275; 219/619; 428/577, 621, 632; 29/875, 879; 419/8, 21, 28; 427/123

[56] References Cited

U.S. PATENT DOCUMENTS

| | | | |
|---|---|---|---|
| 2,216,510 | 10/1940 | Burns | 200/262 |
| 3,913,201 | 10/1975 | Schreiner et al. | 29/182.5 |
| 3,985,989 | 10/1976 | Ip et al. | |
| 4,015,097 | 3/1977 | Schmeisser | 200/275 |
| 4,344,794 | 8/1982 | Szulczyk | 75/173 C |
| 4,456,662 | 6/1984 | Malikowski et al. | 428/632 |
| 4,462,841 | 7/1984 | Miyakawa | 148/431 |
| 4,609,525 | 9/1986 | Schreiner et al. | 419/6 |
| 4,685,608 | 8/1987 | Kujas | 228/227 |
| 4,706,383 | 11/1987 | Saffari | 29/879 |
| 4,764,227 | 8/1988 | Rothkegel et al. | 148/431 |
| 4,971,754 | 11/1990 | Fontet et al. | 419/8 |
| 5,160,366 | 11/1992 | Shibata | 419/21 |

FOREIGN PATENT DOCUMENTS

| | | | |
|---|---|---|---|
| 0283536 | 3/1987 | European Pat. Off. | |
| 2540755 | 9/1975 | Germany | |
| 4024941 | 2/1992 | Germany | |
| 1162887 | 8/1969 | United Kingdom | 228/254 |

Primary Examiner—Samuel M. Heinrich
Attorney, Agent, or Firm—Kenyon & Kenyon

[57] ABSTRACT

Contacts such as contact points, contact strips, or contact sections are usually provided with hard solder on a copper-silver basis in the form of a flat solder layer. The contact is then connected over this solder layer with a contact carrier. The solder layer is melted, whereupon the free surface of the solder layer (13, 130) is covered during melting with a material (1, 5, 15) that has no solubility with silver or copper. The material can, during melting of the solder, form a covering (1, 15) beneath the contact (10, 12, 100) provided on its solder side with the solder layer (13, 130) or can also form a covering over the contact (10, 12, 100) provided on its solder side with the solder layer (13, 130). As materials for covering the solder layer (13, 130), high-melting metals, preferably tantalum, or a ceramic are used. In the case of a semi-finished product for use as a contact, the solder layer (13, 130) is in intimate contact over its entire surface with the solder side of the contact (10, 12, 100) and has the structure of a melt.

31 Claims, 4 Drawing Sheets

METHOD FOR PRESOLDERING A CONTACT FOR AN ELECTRICAL SWITCHING DEVICE AND SEMI-FINISHED PRODUCT FOR USE AS A CONTACT

BACKGROUND OF THE INVENTION

The present invention relates to a method for presoldering a contact for an electrical switching device with CuAg-based hard solder, over which the contact is connectable with a contact carrier for which purpose the hard solder must be applied as a flat layer, preferably with a defined contour, for example using a solder foil or the like, with the applied solder layer being melted. The term "contact" refers to an individual contact point, but can also refer to contact strips or sections to be used in cutting individual contact points to size. In addition the present invention relates to a semi-finished product for use as a contact in an electrical switching device, especially a contact point, contact strip, or contact section, with at least one contact layer and one solder layer being in largely intimate contact with the solder side of the contact over its entire area and having the structure of a melt.

Contact points manufactured by molding technology are usually attached by hard soldering to the contact carriers of switching devices. For this purpose, the solder is applied as a flat layer to the back of the contact point or the contact material in the form of a strip, for example using a solder foil. If the contact is initially in the form of a contact strip or section, from which contact points are later cut to length, a solder layer can also be produced initially by roll bonding. In particular, solder foils can be cut to length simply using an ultrasound technique to form a solder pad and attached uniformly to the solder side of contact points, as described in the German Patent Document No. DE-A-40 24 941. Contacts presoldered in this manner can be processed further mostly automatically and attached within the framework of an integrated manufacturing process, for example by inductive heating and soldering to the contact carrier.

In the latter energy-induced process, problems can occur because solder from the solder side rises above the narrow sides of the contact point and gets on the switching surface. Because of such uncontrollable processes, the switching behavior of the contacts can be affected in an undesirable manner during the proper use of the switching device.

It is therefore desirable for the solder to be applied in a smooth layer during presoldering of contacts, with the area of the solder layer generally being smaller than the area on the solder side of the contact. This is intended to prevent wetting of the narrow sides of the contact with solder.

Usually, especially for switching devices used in energy technology, contacts with a contact material layer with the silver metal composition (AgMe) or silver metal compound (AgMeV, where V is a compound), especially silver metal oxide (AgMeO) are used. Frequently such contacts have a two-layer structure, i.e. they consist of the contact layer itself and a layer of pure silver on the solder side. A solder suitable for this purpose is known which is based on copper and silver, which also can contain phosphorus in particular.

When, according to the prior art, solder foils are applied to the solder sides of contacts, it may be seen that when the solder melts, the solder preferably initially melts at the edges of the solder layer and air or gas inclusions between the solder foil and the contact point usually turn into a central bubble on the solder side of the contact point. To eliminate such bubbles which cause problems with subsequent processing of the presoldered contact points, as well as the associated irregularities on the surface of the solder layer, the solder must be heated until the bubble bursts as a result of the increase in its internal pressure, and breaks up. At such high temperatures, the solder generally runs onto the contact side of the contact point.

Patent Document No. GB-A-11 62 887 describes a method for continuous fastening of a narrow solder strip to a metal strip, for example a contact surface. The solder strip is briefly melted to form an intimate bond with the metal strip and has the structure of a melt. The shape of the solder strip is generally lost in the process, with at least a convex surface being obtained. U.S. Pat. No. 2,216,510 discloses a method for manufacturing contacts in which shaped parts are stamped from soldered parts and are further processed. The plates, presoldered using different methods, are then rolled to ensure a flat surface.

SUMMARY OF THE INVENTION

Taking its departure from this state of affairs and the above-described prior art, the present invention provides a method for presoldering contact points with which a flat solder layer with a defined thickness and a sharp edge contour can be applied. In this method, wetting of the contact side surfaces with solder is particularly to be avoided. At the same time a semi-finished product is provided for use as contacts in switching devices.

According to the present invention the applied solder layer is melted, with the free surface of the solder layer being coated during melting with a material that has no solubility for silver or copper. This method can be used advantageously both for individual contact points and for contact strips and foils.

According to the present invention, a semi-finished product may be obtained for use as contacts, in which the solder layer is in intimate contact with the solder side of the contact over its entire surface, and in which the solder layer has the texture of a melt. Advantageously the solder layer is largely bubble-free on the solder side of the contact or at least has no bubbles whose diameters are larger than the thickness of the solder layer. With a two-layer contact point with a silver-metal oxide layer on the contact side and a pure silver layer on the solder side and a copper-silver-hard solder with a phosphorus content, the melt structure consists of a ternary eutectic and mixed crystals rich in copper or silver. Hence, the use properties of the solder layer in particular are not adversely affected by dissolved silver.

In the method according to a first embodiment of the present invention the material for covering the free surface of the solder layer can form a covering beneath the contact provided on its solder side with the solder layer. In a second embodiment of the method according to the present invention, the material for covering the free surface of the solder layer can form a covering over the contact provided on its solder side with the solder layer. In this case, the contact is reversely arranged for the melting process. In both cases the covering can also be formed by a roller rotating around its axis in which a contact strip or section including the solder strip is continuously guided.

Either a high-melting metal, e.g. tantalum (Ta), molybdenum (Mo), or tungsten (W) or ceramic can be used as a material for forming the covering. It is important in this regard, in addition to the thermodynamic properties of the material, such as insolubility for copper and silver, not to permit any or to permit only a very small wettability of the covering material with liquid solder. It has surprisingly been found that creep of liquid solder into undesired places on the contact points is prevented. In particular this means that at least the side of the contact which is opposite the solder layer is free of solder. In addition, wetting of the narrow sides of the contact with liquid solder can thus be largely prevented.

The present invention has worked especially well when soldering two-layer contact points which consist of a silver-metal oxide layer on the contact side and a pure silver layer on the solder side and which are soldered with a solder containing phosphorus, e.g. L-Ag15P. It has proven to be especially suitable in this regard to perform melting by inductive heating, with locally directed heating being achieved and with the temperature-time curve being usable for process control. However, furnace heating is also possible if the holding time is chosen to be correspondingly short. In addition, for rapid, local heating, a laser or a high power lamp can be used as well. In all cases, the melting of the solder layer advantageously takes place under a protective gas, preferably under noble gas or nitrogen.

BRIEF DESCRIPTION OF THE DRAWINGS

Further details and advantages of the present invention will be apparent from the following description of the figures showing embodiments with reference to the drawings, in conjunction with the claims.

DETAILED DESCRIPTION

Figure 1:
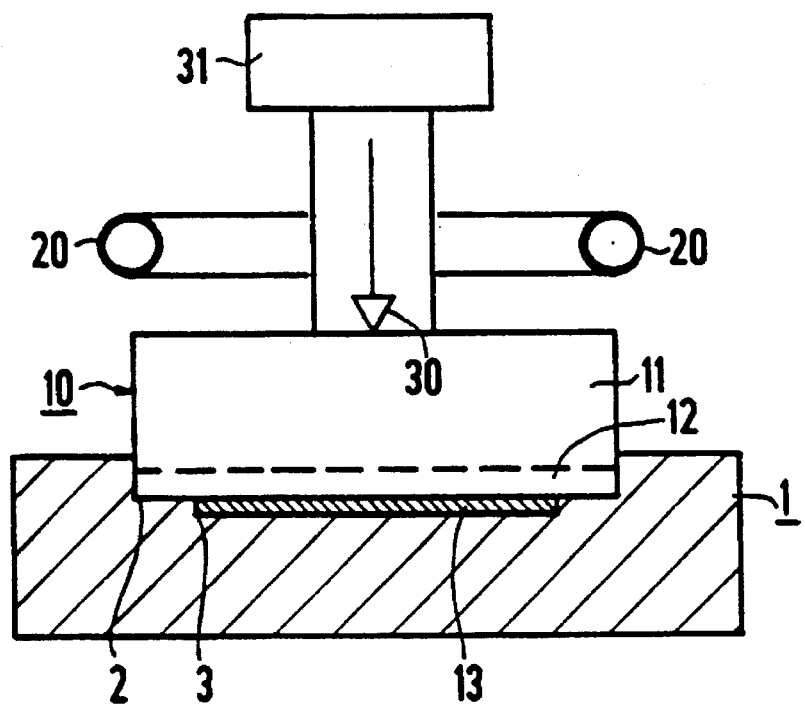
FIG. 1 is a first example illustrating the procedure according to the present invention with a covering beneath a soldered contact point.

In FIG. 1, a molded body 1 made of tantalum (Ta) forms a substrate for a contact point 10 to be soldered with a flat layer 13. Substrate 1 has its top shaped with recesses 2 and 3, with recess 2 matching contact point 10 in size and shape and recess 3 matching solder layer 13 in size and shape.

Contact point 10 is designed as a two-layer contact point and has a layer 11 made of silver metal oxide as a contact (for example, $AgSnO_2Bi_2O_3CuO$). Since this material cannot be soldered, in the manufacture of contact point 10 which is generally performed using sintering technology, its underside is provided with a pure silver layer 12 which is readily solderable. Solder layer 13 is applied to pure silver layer 12, by means of which contact point 10 can later be attached for use in a contact carrier (not shown) in a switching device. In particular, to form solder layer 13, a foil of a suitable CuAg-based hard solder, especially L-Ag15P (so-called Silfos solder) is used, which has a melting range between 650° and 800° C. and a working temperature of approximately 710° C.

A solder foil 13 of this kind can be cut to length in a suitable size from a continuous strip and fitted into recess 3 of substrate 1. Then contact point 10 is applied with its pure silver layer 12 so that the underside rests tightly against solder foil 13. To ensure that the underside rests tightly against solder foil 13, it is important to have exact dimensional stability and fit of the corresponding recesses 2 and 3 in substrate 1.

Figure 2:
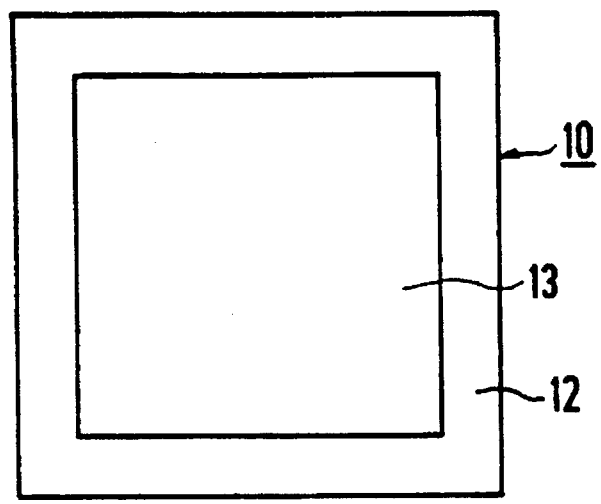
FIG. 2 illustrates the contact point soldered in FIG. 1, in a bottom view.

FIG. 2 illustrates the geometry of the finished, soldered contact point 10 in the shape of a rectangle. Pure silver layer 12 has a larger area than solder layer 13 placed on top of it, with a marginal area that is free of solder. It is especially important in this connection that solder layer 13 have a flat surface, that no central bubble form between solder layer 13 and silver layer 12 and that finished solder layer 13 be completely flat with a constant thickness and sharp contours with a defined geometry. In particular the latter conditions may be neglected in the normal case when melting a solder foil 13. Then liquid solder can spread out over silver layer 12 without definition, over its edges, and also cause wetting of the side surfaces of contact point 10 with solder.

Substrate 1 according to FIG. 1 with recesses 2 and 3 avoids the latter undesirable effect. It is important in this regard for the tantalum itself to have virtually no wettability even for liquid solder. In addition, tantalum exhibits no solubility for silver or copper. A tantalum phosphite that theoretically forms has a high melting point so that it is harmless.

In FIG. 1, turns of an inductor 20 are located for melting solder layer 13 above contact point 10. This provides rapid and directed heating of the system with contact point 10 and solder foil 13. For process control, a temperature sensor 30 is directed at the surface of contact point 10. Temperature sensor 30 operates, for example, according to the infrared radiation principle. In addition, a weight 31 is provided above inductor 20 so that the system composed of contact point 10 and solder layer 13 can be loaded by means of an intermediate element (not shown in greater detail) in order to ensure good heat transfer between contact point 10, solder foil 13, and tantalum substrate 1.

Figure 3:
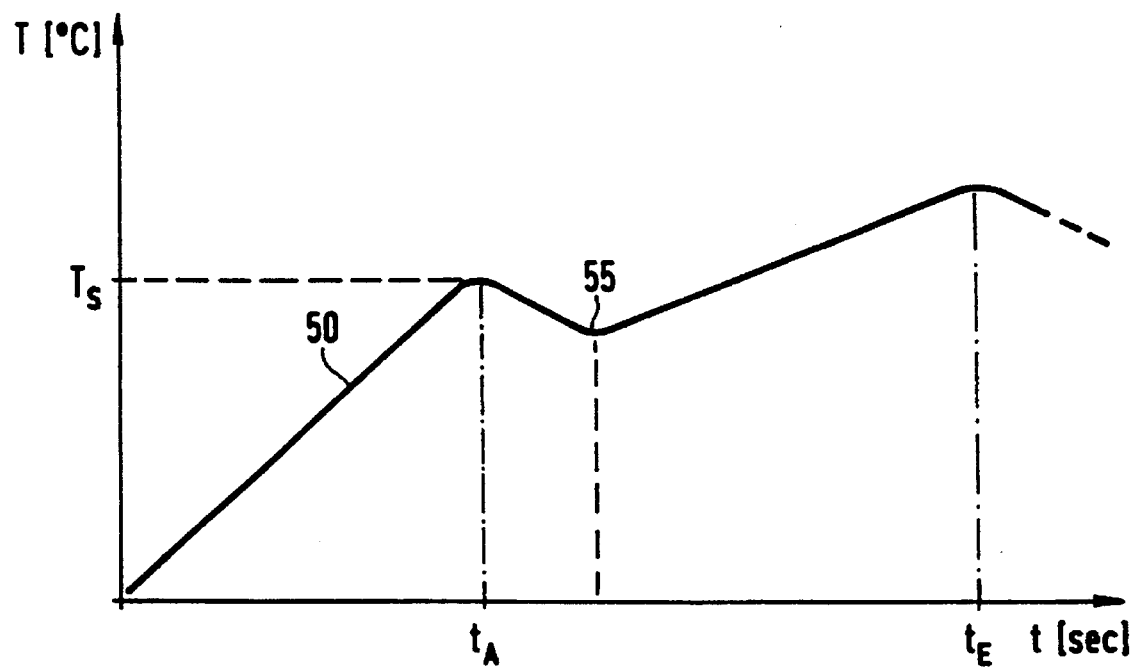
FIG. 3 is a graph showing temperature as a function of time for a system according to FIG. 1.

FIG. 3 shows the temperature control in detail. By means of eddy currents produced in the metal material by inductor 20, which is connected to a source of alternating current, contact point 11 is initially heated with a temperature rise that is approximately uniform. When the lower temperature of the melting range of the solder used is reached at $t_A$, namely approximately $T_S$= 650° C. for Silfos solder, a dip 55 appears in the time-temperature curve 50, since melting heat is required and heat equalization takes place between the warmer contact point 10 and the colder tantalum substrate 1. Then the system (contact point 10-solder layer 13-tantalum substrate 1) warms up at a slower heating rate. At time $t_E$ the upper temperature of the melting range, i.e. the liquidus line in the state diagram, has generally not yet been reached. However, the working temperature of the solder being used prevails, and the system is switched off so that the entire system can cool down.

The process involving melting of solder layer 13 can be regulated by means of the temperature curve T=f(t). In particular, the rapid temperature rise is advantageously first achieved in the contact point by means of inductive heating. Melting of the solder and melting of solder layer 13 then takes place in a very short time. In addition, since barriers are formed by shapes 2 and 3 in tantalum substrate 1, practically no solder can reach the side surfaces of contact point 10.

Figure 4:
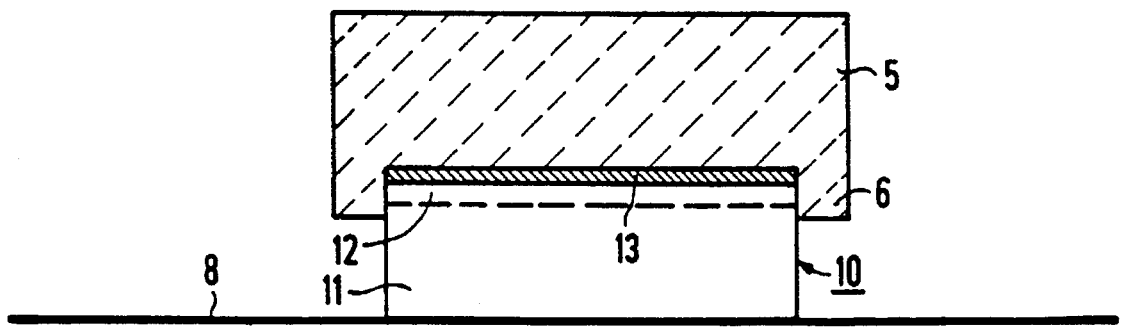
FIG. 4 is an example of an alternative procedure to FIG. 1 with a covering for the soldered contact point.

FIG. 4 shows contact point 10 according to FIG. 1 in the reverse orientation. This means that contact 11 is on the underside and the pure silver layer 12 is on the top side. A hard solder foil for forming solder layer 13 is placed on silver layer 1 and on top of that is a covering 5 with an edge profile 6. The entire system is on a belt 8 that can be guided as a belt moving through a heating furnace.

In the system according to FIG. 4, covering 5 of solder layer 13 forms a surface for contact point 10, and in this case is made of ceramic, for example, which is not wetted by the solder and has no solubility for copper or silver. It is advantageous in this system for gases to be able to escape upward through the molten solder.

Figure 5:
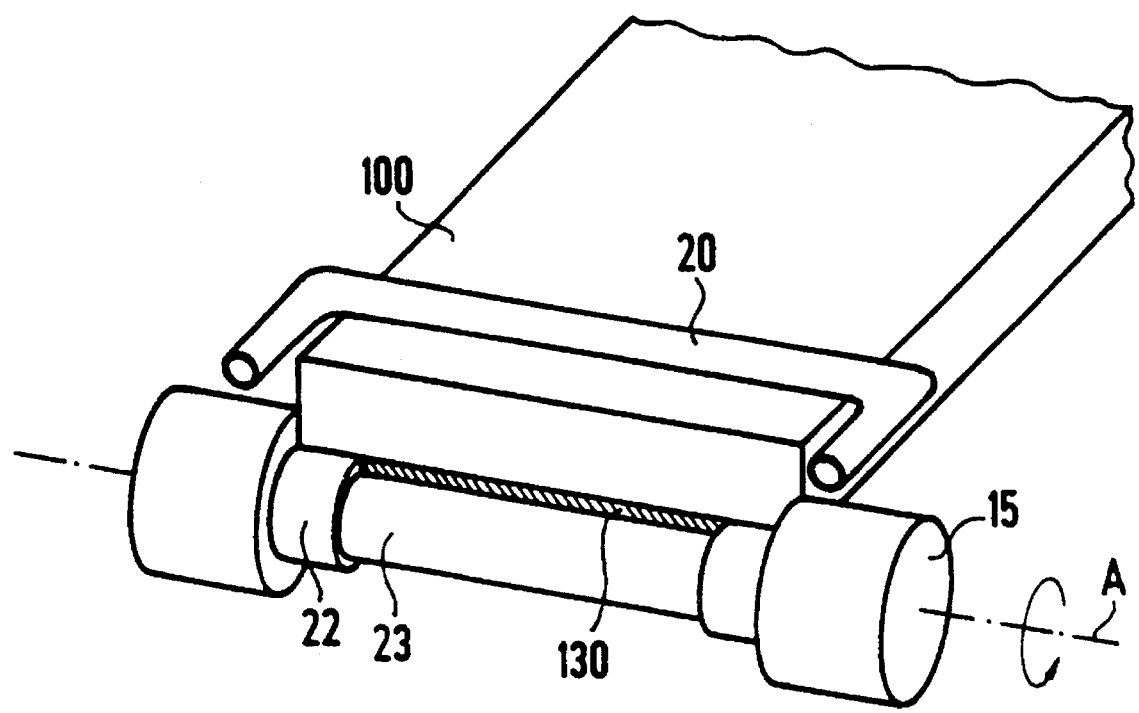
FIG. 5 is an example corresponding to FIG. 1 for manufacturing contact strips or sections.

In FIG. 5, a roller 15 rotatable about its central axis A is provided, serving as a substrate for a contact strip 100. Contact strip 100 is produced, for example, by continuous casting of a powder blank and connected by roll bonding with a solder strip 130. Contact strip 100 including solder strip 130 can also be made in the form of a shape. Contact points can later be cut to size from such strips or sections for use as intended. Roller 15 has recesses 22 and 23 in its surface to receive contact strip 100 and solder strip 130, with an inductor 20 being provided according to the embodiment of FIG. 1. Upon rotation of roller 15, which is composed of high-melting metal or ceramic, the solder portion located in the active area of inductor 20 is melted into the form of a flat layer, with the exactly defined shape again being preserved laterally.

In FIG. 5, roller 15 is shown as a substrate for continuous contact strip 100 with solder layer 130. In the reverse arrangement, contact strip 100 with solder layer 130 can also run beneath roller 15. In both cases the function of a covering is ensured.

The presoldering process involving melting of solder in all examples takes place under a protective gas, preferably a noble gas such as argon or helium, or under nitrogen. As a result a semi-finished product is obtained in which the solder layer has the structure of a melt. Since the contact is preferably made by powder metallurgy, the contact layer (and in a two-layer structure, its solderable silver layer as well) has a sintered structure and the solder layer has the structure of a melt. A light microscope view shows a sharp phase transition between the layers, but a solid material bond is present. There is practically no chance of harmful dissolution of the silver which is in contact. In particular, the solder surface is then free of defects.

Figure 6:
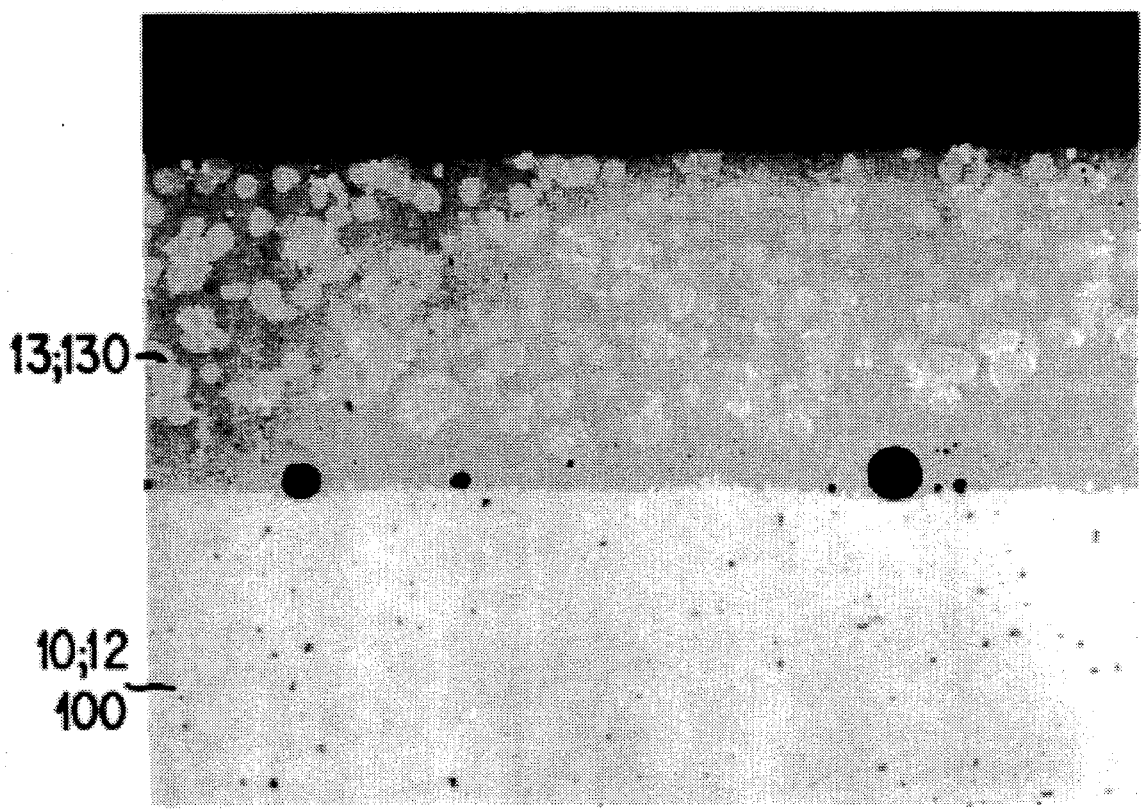
FIG. 6 illustrates the microstructure of a solder layer of a semi-finished product for contacts.

It is clear from FIG. 6 that the molten solder layer is in intimate contact with the solder side of the contact rand has the structure of a melt. As a result of heating which is only brief, silver is only slightly dissolved on the solder side of the contact point. However in the transition area up to a thickness of a maximum of one-third of the solder layer, silver dendrites can form. Any gas inclusions that are still present are so small that they do not adversely affect the surface of the solder layer and therefore cause no problems.

Solder layer 13 or 130 in FIG. 6 is largely free of silver dendrites. The structure of the solder layer, according to state diagram Cu-Ag-P, mainly consists of ternary eutectic and also of mixed crystals rich in copper or silver. The precise melting of the solder layer beneath the liquidus line in the state diagram produces the usage properties of the solder without changing the working temperature.

In the same manner as the method described above, contacts based on silver-metal, for example silver-nickel, or based on other silver-metal compounds, can be coated with suitable solder. Instead of a solder foil, solder pastes may be used to form the solder layer. In addition to tantalum or ceramic, tungsten or molybdenum or other suitable metals may be used as material for the covering beneath or on top of the contact.

What is claimed is:

1. A method for presoldering a contact for an electrical switching device comprising steps of:
   connecting the contact with a contact carrier using CuAg-based hard solder, wherein the hard solder is applied as a flat solder layer; and
   melting the applied solder layer wherein during the melting the free surface of the solder layer is covered with a material that exhibits no solubility with respect to silver (Ag) or copper (Cu).

2. A method according to claim 1, wherein during the step of melting the applied solder layer, the material that exhibits no solubility with respect to silver or copper forms a covering which is located beneath the contact on a solder side with the solder layer.

3. A method according to claim 2, wherein during the melting step, the covering forms a receptacle for the solder layer and the solder side of the contact.

4. A method according to claim 1, wherein during the melting of the solder, the material forms a covering located on top of the contact on a solder side with solder layer.

5. A method according to claim 1, wherein the material for covering the solder layer is a molded body made of a high-melting metal.

6. A method according to claim 1, wherein the material for covering the solder layer is a ceramic molded body roller.

7. A method according to claim 1, wherein the melting of the solder layer is produced by inductive heating.

8. A method according to claim 7, wherein a temperature-time curve is used to regulate the melting of the solder layer.

9. A method according to claim 1, wherein the melting of the solder layer is produced by heating in a furnace.

10. A method according to claim 1, wherein the melting of the solder layer takes place under a protective gas.

11. A semi-finished product for use as a contact for an electrical switching device, comprising:
    at least one contact layer; and
    one solder layer;
    wherein the solder layer is in intimate contact over its entire surface with a solder side of the contact and wherein the solder layer has the structure of a melt without any mechanical treatment; and
    wherein the solder layer has a rectangular shape with an equal or slightly smaller surface than the contact layer, and has. 8harp contours, a defined thickness and an even surface.

12. A semi-finished product according to claim 11, wherein the solder layer is on the solder side of the contact and is largely bubble-free or at least has no bubbles whose diameters are larger than a thickness of the solder layer.

13. A semi-finished product according to claim 11, wherein at least a side of the contact which is opposite the solder layer is free of solder.

14. A semi-finished product according to claim 13, wherein side surfaces of the contact are also free of solder.

15. A semi-finished product for use as a contact for an electrical switching device, comprising:
    at least one contact layer; and
    one solder layer;
    wherein the solder layer is in intimate contact with a solder side of the contact over its entire surface and wherein the solder layer has the structure of a melt; and
    wherein a solder-free marginal area with a sharp contour is present on the solder side of the contact.

16. A semi-finished product according to claim 11, wherein the solder layer is rectangular in shape.

17. A semi-finished product according to claim 11, wherein the contact has a sintered structure and the solder layer has a structure of a melt.

18. A semi-finished product according to claim 11, wherein the contact is a two-layer contact point.

19. A semi-finished product according to claim 18, wherein the contact has a silver-metal oxide (AgMeO) layer on the contact side and a pure silver layer on the solder side.

20. A semi-finished product according to claim 19, wherein the pure silver layer is dissolved only slightly and wherein silver dendrites are present for no more than one-third of the thickness of the solder layer.

21. A semi-finished product according to claim 11, wherein the solder layer is a hard solder based on copper and silver with a phosphorus content (so-called Silfos solder) and wherein the melt structure consists of a ternary eutectic and mixed crystals rich in copper and/or silver.

22. A method according to claim 1, wherein the hard solder is applied as a flat solder layer with a defined contour using a solder foil or the like.

23. A method according to claim 5, wherein the high-melting metal is tantalum (Ta), molybdenum (Mo), tungsten (W) or mixtures thereof.

24. A method according to claim 5, wherein the high-melting metal is tantalum (Ta).

25. A method according to claim 10, wherein the protective gas is a noble gas or nitrogen.

26. A semi-finished product according to claim 11, wherein the solder layer is rectangular in shape with a same size or smaller size surface as the contact layer and wherein the surface is a flat surface.

27. A semi-finished product according to claim 11, wherein a solder-free marginal area with a sharp contour is present on the solder side of the contact.

28. A semi-finished product according to claim 11, wherein the contact has a sintered structure.

29. A semi-finished product according to claim 11, wherein the contact is a contact such as a contact point, contact strip, or contact section.

30. An arrangement for manufacturing a semi-finished product, the semi-finished product for use as a contact for an electrical switching device, and including at least one contact layer and one solder layer, wherein the solder layer is in intimate contact with a solder side of the contact over its entire surface and wherein the solder layer has the structure of a melt, the arrangement including a device for melting a solder layer on a back side of the contact, the melting device including means for covering a free surface of the solder layer.

31. An arrangement for manufacturing a semi-finished product according to claim 30, wherein the means for covering forms a molded body made of at least one of high-melting metal and ceramic.

* * * * *